April 30, 1963    J. H. POTTS, JR    3,087,695
PARACHUTE PACK OPENING MECHANISM
Filed Sept. 20, 1961    2 Sheets-Sheet 1

INVENTOR.
JAMES H. POTTS, JR
BY
ATTYS
AGENT

April 30, 1963 J. H. POTTS, JR 3,087,695
PARACHUTE PACK OPENING MECHANISM
Filed Sept. 20, 1961 2 Sheets-Sheet 2

INVENTOR.
JAMES H. POTTS, JR.
BY W. O. Quesenberry
O. Hodges ATTYS.
P. R. Harder AGENT 3,087,695
PARACHUTE PACK OPENING MECHANISM
James H. Potts, Jr., Silver Spring, Md., assignor to the United States of America as represented by the Secretary of the Navy
Filed Sept. 20, 1961, Ser. No. 140,172
18 Claims. (Cl. 244—147)
(Granted under Title 35, U.S. Code (1952), sec. 266)

The invention described herein may be manufactured and used by or for the Government of the United States of America for governmental purposes without the payment of any royalties thereon or therefor.

The present invention relates to a parachute pack and parachute pack opening mechanism for a bomb, mine, or any other device that is to be air dropped and suspended from a parachute and more particularly to a ball-locked, explosively released, spring-loaded parachute housing which is ejected upon detonation of the explosive and which forcibly deploys the parachute contained therein upon ejection of the parachute housing.

In the field of air dropped devices, it has been the general practice to provide the device with a large parachute, enclosed in a parachute housing attached to the device, which after release from the aircraft is ejected to deploy the large parachute. In order to prevent the parachute housing from becoming entangled in the large parachute, it has been the general practice to employ a second smaller parachute attached to the parachute housing which is deployed before operation of the main parachute pack opening mechanism. This smaller parachute, commonly known as an extraction parachute, is utilized to aid in the removal of the main parachute housing and to suspend the main parachute housing after separation from the main parachute.

The ball-locked mechanism utilized in the present invention is the single attachment point between the parachute housing and the device to be air dropped. Since the extraction parachute attached to the main parachute housing is deployed before actuation of the ball-locked mechanism of the main parachute pack assembly, this mechanism must be capable of functioning under aerodynamic loads up to 12,000 pounds which are transmitted from the extraction parachute to the main parachute housing and the ball-locked mechanism. Further, the ball-locked mechanism must be capable of functioning after being exposed to severe vibrations and "g" loadings incident to captapult takeoff or flight maneuvers of the aircraft.

It is, therefore, an object of the present invention to provide a parachute pack and pack opening mechanism for a device that is to be air dropped.

Another object is to provide a parachute pack opening mechanism for ejecting a parachute housing and forcibly deploying a parachute contained therein.

A further object is the provision of a ball-lock mechanism capable of withstanding loads up to 12,000 pounds and capable of functioning after being exposed to severe vibration and gravity loadings incident to the aircraft flight.

Still another object is to provide a means for aiding in the extraction of the main parachute housing and which will subsequently suspend the main parachute housing to prevent entanglement thereof with the main parachute.

Other objects and many of the attendant advantages of this invention will be more readily appreciated as the same becomes better understood by reference to the following detailed description when considered in connection with the accompanying drawings in which.

Figure 1:
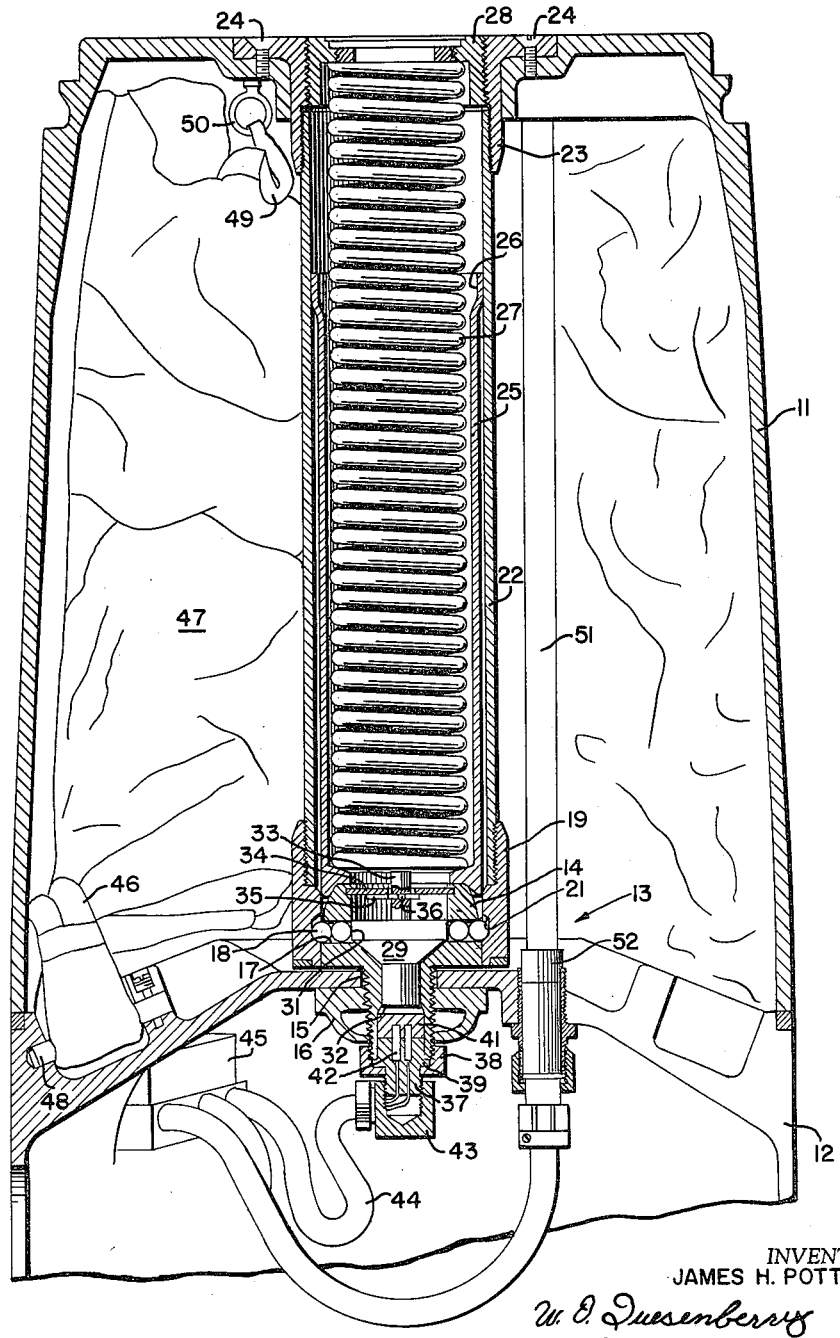
FIG. 1 illustrates a plan view, partly in section, of a preferred embodiment of the main parachute pack and pack opener assembly.

Referring now to the drawings wherein like reference numerals designate like parts throughout the several views thereof and more particularly to FIG. 1, there is illustrated a main parachute housing 11 secured to the adapter 12 by the parachute pack opening mechanism, generally indicated by the numeral 13. The adapter 12 is secured to a bomb, mine, or any other device to be air dropped, in any suitable manner, one example of which will be described more fully in connection with the description of FIG. 2. It is to be understood, that the adapter 12 need not be utilized provided the outer container of the load device to be air dropped is adapted to receive the ball-lock mechanism 13 and is provided with suitable means for connection of the parachute risers thereto.

The ball-lock mechanism 13 comprises a sleeve 14 secured within the central aperture 15 in adapter 12 by a nut 16 threaded thereon. The sleeve 14 has four quadrately spaced apertures 17, within each of which is contained a pair of steel balls 18 for locking the component parts of the parachute pack together in the manner which will become more readily apparent as the description proceeds.

Fitted about the sleeve 14 is a collar 19 having a plurality of beveled recesses 21 to receive a portion of the balls 18 to lock the collar 19 to sleeve 14. It is to be understood that the recess 21 may be formed as a single continuous annular recess or may be a plurality of quadrately spaced recesses, as the case may be. Cylinder 22 is threaded at one end into collar 19, and at the other end into an end cap 23 secured by a plurality of circumferentially spaced screws 24 to the parachute housing 11. Contained within cylinder 22 is a guide tube 25 having an expanded end portion 26 and a spring 27 which abuts the guide tube at one end and a spring retainer 28 threadably secured within the cap 23 at the other end thereof.

Fitted within sleeve 14 for translatory movement therein is a plunger 29 having an expanded portion 31, a piston portion 32, and a stem portion 33. Premature translation of plunger 29 is prevented by retainer 34 secured within a groove in sleeve 14 which is abutted by E ring 35 having the central portion 36 extending through an aperture in the stem 33 of plunger 29. The expanded portion 31 of stem 29 abuts the steel balls 18 to prevent movement thereof and to secure the balls into the recess 21 in collar 19.

Explosive adapter 37 is secured within the sleeve 14 by a cap 38 threaded to sleeve 14 and engaging the flange 39 on adapter 37. Contained within explosive adapter 37 closely adjacent the face of piston portion 32 is an explosive 41 which may be about one-quarter gram of unique pistol powder, that can be ignited by a pair of electrically fired, time delayed detonating caps 42. Cable adapter 43 threaded to the explosive adapter 37 is utilized to make the necessary electrical connections from detonating caps 42 to the electrical cable 44 connected to the high voltage power supply 45.

The risers 46 of parachute 47 are secured to the adapter 12 by a plurality of clevis pins 48 only one of which has been illustrated for the sake of simplicity. The crown of the parachute 47 is secured through parachute attachment line 49 to the ring 50 connected to the parachute housing 11 for reasons that will become more readily apparent as the description proceeds.

Figure 2:
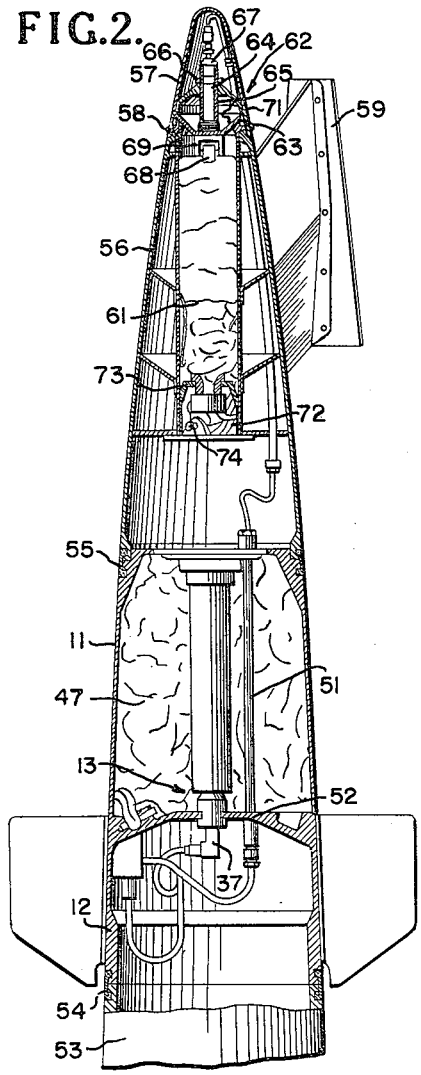
FIG. 2 illustrates the parachute pack and pack opening mechanism of FIG. 1 in combination with one preferred embodiment, partially in section, of an extraction parachute housing and opening mechanism therefor.
Figure 3:
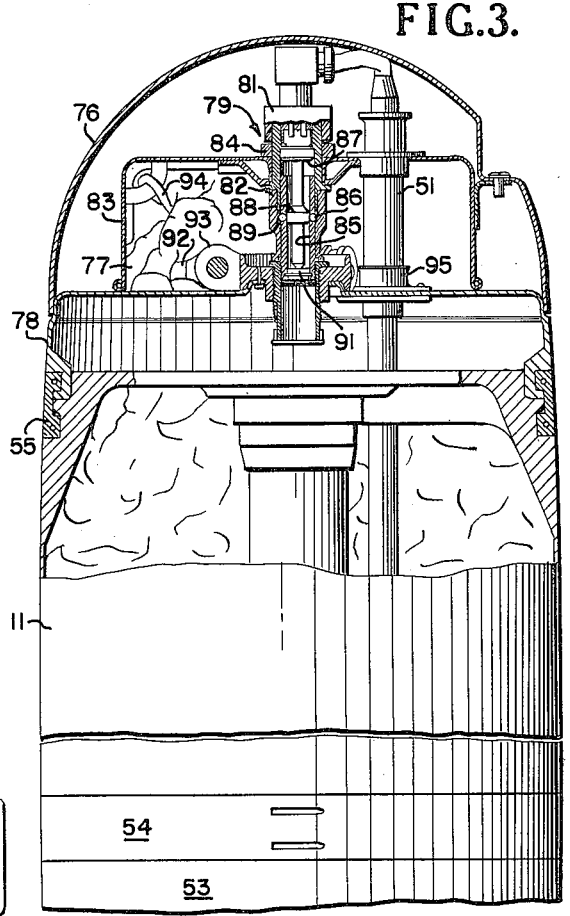
FIG. 3 illustrates the parachute pack and pack opening mechanism of FIG. 1 in combination with a second embodiment, partially in section, of another extraction parachute housing and opening mechanism therefor.

Electrical cable 51 is utilized to provide the necessary electrical pulse from power supply 45 to the extraction parachute pack opener connected to the main parachute housing 11 as will more readily be understood in connection with the description of FIGS. 2 and 3. Cable 51 is provided with a quick opening, pull type connection 52 to provide for separation of the cable when parachute housing 11 is ejected to deploy the parachute 47.

The parachute pack and pack opening mechanism is assembled in the condition illustrated in FIG. 1 and as is apparent, the spring 27 compressed within cylinder 22 exerts a force on spring retainer 28 that is transferred through end cap 23 and cylinder 22 to the collar 19 and also exerts a force in the opposite direction on guide tube 25 which tends to telescope tube 25 within the cylinder 22. Movement of the guide tube 25 within cylinder 22 is prevented by the guide tube bearing against sleeve 14 and as is apparent the action of spring 27 tends to translate collar 19 along sleeve 14. Steel balls 18 in apertures 17 within sleeve 14 are held in place by the expanded portion 31 of plunger 29 and engage the recess 21 in collar 19 to prevent movement between collar 19 and the sleeve 14.

When the device is released from the aircraft, power supply 45 is activated to supply a firing pulse to the detonating caps 42. After the desired time delay built into caps 42, the powder 41 is detonated. The force of the explosion of powder 41 against the face of piston portion 32 of plunger 29 is sufficient to break the center portion 36 of E ring 35 and allow translation of the plunger within the sleeve 14. Movement of the plunger 29 removes the expanded portion 31 from its abutting engagement with the balls 18, and balls 18 are translated inwardly into the recess now present within sleeve 14 by the component of force applied thereto by the bevel of recess 21 in collar 19. This movement of balls 18 unlocks collar 19 from sleeve 14 and the spring forces the collar 19 and the parachute housing 11 attached thereto away from sleeve 14 and the adapter 12 with great force.

Since the crown of parachute 47 is attached to the parachute housing 11 by the attachment line 49, ejection of the parachute housing 11 forcibly deploys the parachute 47. The attachment line 49 is subsequently separated by the force created by the extraction parachute connected to the housing 11 as will become better understood in connection with the description of FIGS. 2 and 3.

As the parachute housing 11 is ejected away from the adapter 12, the guide tube 25 telescopes within cylinder 22 until the expanded portion 26 engages the collar 19. Telescoping of guide tube 25 within the cylinder 22 allows the spring 27 to expand to its uncompressed condition yet engagement of the expanded portion 26 of guide tube 25 with the collar 19 retains the spring 27 within the cylinder 22 to prevent its becoming released and entangled within the parachute 47. The quick opening, pull type connector 52 provides for suitable disconnection of cable 51 from the power supply 45 contained within adapter 12 when the parachute housing 11 is ejected.

Spring 27 may be constructed to exert a force tending to separate the parachute housing 11 from the adapter 12 of approximately 1,000 pounds and it is obvious that such a force provides for rapid ejection of the parachute housing 11 and positive, quick deployment of parachute 47. The ball-lock mechanism herein described is sufficiently rigid to withstand the 12,000 pound forces transmitted thereto by the ejection chute and is capable of functioning after being exposed to severe aircraft vibration and "g" loadings incident to catapult takeoff and flight maneuvers.

Referring now to FIG. 2 there is illustrated the housing 11 of main parachute 47 and adapter 12 secured to the aft section of a bomb 53 by clamp band 54. The clamp band engages a recess in the adapter 12 and a recess in the aft section of bomb 53 and may be held in place by a plurality of screws, not shown. Secured in like manner to the aft section of main parachute housing 11 by clamp band 55 is a tail fairing 56 having a pack opener housing 57 secured thereto by a plurality of shearable rivets 58. Secured to the tail fairing 56 may be a plurality of stabilizing fins 59, such for example, as the stabilizing fin described in my copending application Serial No. 781,817, filed December 19, 1958, now Patent No. 3,015,269.

The tail fairing 56 houses an extraction parachute 61 and an explosive pack opener, generally indicated by the reference numeral 62, the details and operation of which are more fully described in my copending application, Serial No. 140,174 filed on even date herewith.

Generally, however, the explosive pack opener 62 comprises a bell-shaped member 63 having a solid cylindrical stem 64 secured thereto, the stem 64 extending within a hollow cylindrical sleeve 65, sleeve 65 being secured to the extraction pack opener housing 57 by nut 66. Secured to and extending within sleeve 65 is an explosive adapter 67, the details of which are identical to the explosive adapter 37 utilized in the main pack opener 13 hereinbefore described in connection with FIG. 1.

The crown of extraction parachute 61 is connected by the attachment line 68 to the bracket 69 secured to the bell-shaped member 63. Tie-lines 71 loosely connect the bell-shaped member 63 to the pack opener housing 57 and the shroud lines 72 of parachute 61 are extended through the aperture in sliding cup 73 and attached to the clevis pin 74 secured within tail fairing 56. Cable 51 is connected to the explosive adapter 67 and is provided with a second quick opening, pull-type connection, not shown, to allow separation of the cable when the extraction parachute is ejected and deployed in like manner as the connection provided at 52.

As has been hereinbefore described the explosive adapters are provided with a plurality of time-delayed, electrically-fired detonating caps and in practice, it is generally desirable to eject and deploy the extraction parachute before ejection and deployment of the main parachute. Therefore, it is the general practice to provide the time-delay detonating caps within the explosive adapter 37 attached to the pack opener 13 of main parachute 47, with a longer delay than is provided in the detonating caps associated with the explosive adapter 67 of the extraction pack opener 62. As the bomb 53 is released from the aircraft the power supply 45 furnishes a firing pulse to the explosive adapters 37 and 67. Due to the difference in the delay time the explosive adapter 67 ignites the explosive contained therein before the explosive in adapter 37 is ignited.

The force of the explosion confined within sleeve 65 between the explosive adapter 67 and the face of stem 64 is sufficient to shear rivets 58 and translate sleeve 65 along stem 64. This translation continues until tie-lines 71 tighten. The initial translation of sleeve 65 along stem 64 separates electrical cable 51 at the quick opening, pull-type connector. The inertia of the sleeve 65 after tie-lines 71 tighten is sufficient to pull the bell-shape member 63 and the extraction parachute attached thereto from within the tail fairing 56 and, after shroud lines 72 of parachute 61 tighten, is sufficient to part attachment line 68 to prevent the explosive pack opener 62 and the attached parts from becoming entangled in the extraction parachute 61.

Figure 4:
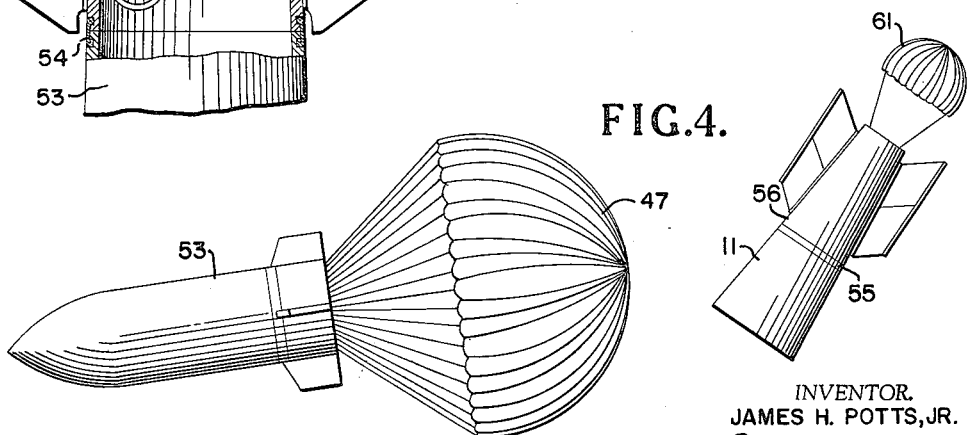
FIG. 4 illustrates a pictorial view of a bomb in flight embodying the combination of FIG. 2 after ejection of the main parachute housing and deployment of the main parachute.

After complete deployment of the extraction parachute 61, the explosive contained within the explosive adapter 37 of the main parachute pack opener 13 is ignited and main parachute 47 is deployed in the manner hereinbefore described in connection with the operation of FIG. 1. After the attachment line connecting the crown of main parachute 47 to the parachute housing 11 parts as hereinbefore described the extraction parachute 61 suspends the tail fairing 56 and the parachute housing 11 attached thereto and prevents these elements from becoming entangled within the main parachute 47 as illustrated in FIG. 4.

Referring now to FIG. 3 there is illustrated the main parachute housing 11 secured to a bomb 53 by band 54 in like manner as described in connection with FIG. 2, and a second preferred embodiment of an extraction parachute pack and pack opener. The parachute pack and pack opener of FIG. 3 may be of the type more fully described in my copending application, Serial No. 140,175 filed on even date herewith.

The parachute housing and pack opener generally consists of a pack opener housing 76 containing an extraction parachute 77, the housing being secured to adapter 78 by an explosive pack opener generally indicated by the reference numeral 79. Adapter 78 is secured to the aft section of main parachute housing 11 by a clamp band 55 in like manner as described in connection with FIG. 2. The explosive pack opener 79 generally comprises an explosive adapter 81, similar in construction to the adapters 37 and 67 hereinbefore described, secured to sleeve 82 which is secured to parachute housing 83 by nut 84. Secured to the adapter 78 and extending within sleeve 82 is a stem 85 having a plurality of apertures therein for receiving steel balls 86. Contained within stem 85 is a piston 87 having an expanded portion 88 which secures steel balls 86 within the apertures and maintains the balls in engagement with the recess 89 in sleeve 82. The piston 87 is held from premature movement by frangible disc 91 secured within stem 85. Shroud lines 92 of extraction parachute 77 are secured to the adapter 93 and the crown of parachute 77 is attached by attachment line 94 to the parachute housing 83. Cable 51 is provided with a pull-type, quick opening connection 95 where it extends through adapter 78.

As described in connection with FIG. 2 the explosive pack opener 79 of the extraction parachute pack is detonated before detonation of the main parachute pack opener. When explosive adapter 81 is detonated, piston 87 is driven through frangible disc 91 thereby removing the expanded portion 88 from its abutting relation with steel balls 86. Translation of piston 87 is stopped by abutment with stem 85 and the upper surface of piston 87 forms with the explosive adapter 81 a closed chamber within sleeve 82. The expansion of the explosive gases within this closed chamber tends to translate sleeve 82 along stem 85 and a component of force caused by the recess 89 in sleeve 82 forces the steel balls 86 inwardly thereby unlocking the sleeve 82 from stem 85. The explosive force within the chamber is sufficient to translate sleeve 82 along stem 85 and hurls the pack opener housing 76 and parachute housing 83 outwardly carrying with it the attachment line 94 to forcibly deploy the extraction parachute 77.

The main parachute pack opener is then activated to release the main parachute housing 11 and to deploy the main parachute as has been hereinbefore described in connection with FIGS. 1 and 2. The extraction parachute aids in the extraction of parachute housing 11 and consequently suspends the housing to prevent entanglement with the main parachute 47 as illustrated in FIG. 4.

Ejection and deployment of the extraction parachute submits the main parachute housing and ball-lock mechanism, the only point of attachment between the parachute housing 11 and the bomb 53, to dynamic loads up to 12,000 lbs. The ball-lock mechanism utilized in the main parachute pack opener must be capable of withstanding such loads and be capable of functioning under such loads. The ball-lock mechanism hereinbefore described has been found suitable for use under such conditions and further is capable of functioning after being exposed to severe vibrations and "g" loadings incident to catapult takeoff and flight maneuvers of the aircraft.

There has been illustrated and described a new and unique parachute pack and ball-lock mechanism which functions to eject the main parachute housing and forcibly deploy the main parachute in combination with a pair of preferred embodiments of an extraction parachute pack and pack opener utilized in conjunction therewith.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the United States is:

1. A parachute pack and pack opener comprising an adapter for connecting a parachute to a load, a parachute attached to said adapter, a spring loaded housing enclosing said parachute, a releasable locking means secured to said adapter to lock said spring loaded housing against said adapter, explosive means on said releasable locking means to unlock said locking means whereby when said explosive means is detonated said locking means releases said housing and said housing is ejected, said spring loaded housing comprising an outer casing, a first hollow cylinder having a pair of ends, said cylinder being attached to said casing at one of said ends, a collar secured to said cylinder at the other of said ends, a second hollow cylinder within said first cylinder, a spring within said second and said first cylinders, said spring engaging said casing and said second cylinder in such a manner as to tend to force said second cylinder from within said first cylinder, said second cylinder bearing against said releasable locking means and said collar being engaged by said locking means to lock said second cylinder within said first cylinder to hold said spring in a compressed condition, whereby when said locking means is released said first cylinder is moved along said second cylinder as said casing is ejected by said spring.

2. The parachute pack and pack opener of claim 1 wherein said second cylinder has an expanded portion at one end thereof for engaging said collar to prevent said spring and said second cylinder from becoming detached from said casing as the casing is ejected.

3. The parachute pack and pack opener of claim 2 including means securing said parachute to said casing in such a manner so as to forcibly deploy said parachute when said casing is ejected.

4. The parachute pack and pack opener of claim 1 wherein said releasable locking means comprises a sleeve having a plurality of apertures therein, a piston within said sleeve, said piston having an expanded portion thereon and movable from a locked position to an unlocked position, a plurality of balls within each of the plurality of apertures, said collar surrounding said sleeve when said spring is in the initial compressed condition, the expanded portion of said piston being adjacent the apertures to lock said balls within the apertures and against said collar when said piston is in the locked position, said piston being driven to the unlocked position by detonation of said explosive means to release said balls and said collar.

5. The parachute pack opener of claim 4 wherein said locking means further includes a frangible E ring engaging said piston and sleeve to hold said piston in the locked position thereby to prevent premature movement thereof, said E ring being broken upon detonation of said explosive means.

6. The parachute pack and pack opener of claim 5 including means for detachably securing said parachute to said casing in such a manner so as to forcibly deploy said parachute.

7. The parachute pack and pack opener of claim 5 wherein said explosive means comprises an adapter secured to and extending within said sleeve, an explosive secured within said adapter and at least one time-delayed electrically fired detonator for detonating said explosive.

8. In combination, a main parachute, a main parachute load, said main parachute being connected to said load, a spring loaded housing for said main parachute, a releasable ball-lock mechanism secured to said load adapted to lock said spring loaded housing against said load, explosive means on said ball-lock mechanism to unlock said mechanism whereby when said explosive means is detonated said locking mechanism releases said spring loaded housing and said housing is ejected, an extraction parachute secured to said spring loaded housing, an extraction parachute housing, releasable locking means for locking said extraction parachute housing about said extraction parachute, and explosive release means connected to said extraction parachute housing to release said locking means and eject said extraction parachute housing as the explosive release means is activated.

9. The combination of claim 8 wherein said releasable locking means is a ball-locked mechanism.

10. The combination of claim 8 wherein said releasable locking means comprises a plurality of shearable rivets.

11. The combination of claim 8 wherein said main parachute and said extraction parachute are detachably secured to said spring loaded housing and said extraction parachute housing respectively whereby when the housings are ejected the parachutes are forcibly deployed.

12. In combination, a main parachute, a spring loaded housing for said parachute, a load device, said main parachute being attached to said device, a releasable ball-lock mechanism means securing said mechanism to said load device, said mechanism locking said spring loaded housing about said main parachute, explosive means on said mechanism to release said ball-lock mechanism whereby when said explosive means is detonated said locking mechanism is released and said main parachute housing is ejected, a tail fairing secured to said main parachute housing, an extraction parachute secured to and packed within said fairing, an explosive pack opener, a housing secured to said opener, said housing secured to said fairing by a plurality of shearable rivets, means detachably securing said extraction parachute to said opener whereby when said opener is detonated said rivets are sheared and said opener and said housing are ejected by the explosive force to forcibly deploy said extraction parachute.

13. The combination of claim 12 wherein said explosive pack opener and said explosive means each contains a time delayed electrically fired detonator, the time delay of said explosive means being longer than the delay of said explosive pack opener, said detonators being initiated from a common source whereby said extraction parachute is deployed before detonation of said explosive means.

14. In combination, a main parachute, a spring loaded housing for said parachute, a load device attached to said main parachute, a releasable ball-lock mechanism, means securing said ball-lock mechanism to said load device, said mechanism initially locking said spring loaded housing about said main parachute, explosive means on said mechanism to release said ball-lock mechanism whereby when said explosive means is detonated said locking mechanism is released and said spring loaded housing is ejected, an extraction parachute, an extraction parachute housing, an explosive pack opener, means securing said extraction parachute and said opener to said main parachute housing, means securing said extraction parachute housing to said opener and about said extraction parachute whereby when said explosive pack opener is detonated said extraction parachute housing is ejected by the detonation thereof.

15. The combination of claim 14 wherein said main parachute and said extraction parachute are detachably secured respectively to said spring loaded housing and said extraction parachute housing whereby when the housings are ejected the respective parachutes are forcibly deployed.

16. The combination of claim 14 wherein said explosive pack opener comprises a stem having a plurality of apertures therein, a sleeve about said stem, said sleeve being secured to said extraction parachute housing, a plurality of balls, a different one of said balls being disposed within each of the apertures, a piston within said stem, said piston having an expanded portion adjacent the apertures to lock said balls in the apertures and against said sleeve when said piston is in a locked position, an explosive secured adjacent said piston to drive said piston to an unlocked position whereby when said explosive is detonated said piston is driven to the unlocked position and said sleeve is translated along said stem to eject said extraction parachute housing.

17. The combination of claim 16 wherein said extraction parachute is detachably secured to said extraction parachute housing whereby said extraction parachute is forcibly deployed when said extraction parachute housing is ejected.

18. The combination of claim 14 wherein said explosive means and said explosive pack opener each contains a time delayed electrically fired detonator, the time delay of said explosive means being longer than the time delay of said explosive pack opener, said detonators being initiated from a common source whereby said extraction parachute is deployed before detonation of said explosive means.

References Cited in the file of this patent

UNITED STATES PATENTS

| | | |
|---|---|---|
| 2,812,148 | Fogal et al. | Nov. 5, 1957 |
| 2,967,685 | Magnuson | Jan. 10, 1961 |